(12) United States Patent
Huang et al.

(10) Patent No.: US 12,206,489 B2
(45) Date of Patent: Jan. 21, 2025

(54) LONG DISTANCE DISTRIBUTED FIBER OPTIC SENSING (DFOS) AND WDM COMMUNICATIONS OVER REPEATED FIBER SPANS USING ALL-RAMAN AMPLIFICATION AND CODING SCHEMES

(71) Applicant: NEC Laboratories America, Inc., Princeton, NJ (US)

(72) Inventors: Yue-Kai Huang, Princeton, NJ (US); Ezra Ip, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 135 days.

(21) Appl. No.: 18/109,247

(22) Filed: Feb. 13, 2023

(65) Prior Publication Data

US 2023/0269019 A1 Aug. 24, 2023

Related U.S. Application Data

(60) Provisional application No. 63/311,497, filed on Feb. 18, 2022.

(51) Int. Cl.
*H04J 14/02* (2006.01)
(52) U.S. Cl.
CPC ................................ *H04J 14/0212* (2013.01)
(58) Field of Classification Search
CPC .................................................. H04J 14/0212
USPC ........................................................... 398/48
See application file for complete search history.

(56) References Cited

U.S. PATENT DOCUMENTS

| 7,628,531 B2 * | 12/2009 | Lee ......................... G01N 17/00 |
| | | 374/161 |
| 8,923,663 B2 * | 12/2014 | Hill ......................... G01D 5/353 |
| | | 385/12 |
| 10,935,417 B2 * | 3/2021 | Cedilnik ............ G01D 5/35361 |
| 11,032,004 B1 * | 6/2021 | Akasaka ............ H04B 10/0795 |

(Continued)

FOREIGN PATENT DOCUMENTS

CA 3168556 A1 * 8/2021 ............. E21B 47/06

OTHER PUBLICATIONS

Boito et al.; A VCSEL-based backbone extended-reach optical fibre network: Supporting up to 10Gbps flexible access networks for Africa; May 2018;Optical fiber technology; pp. 1-5. (Year: 2018).*

*Primary Examiner* — Amritbir K Sandhu
(74) *Attorney, Agent, or Firm* — Joseph Kolodka (57) ABSTRACT

Aspects of the present disclosure describe distributed fiber optic sensing (DFOS) systems, methods, and structures that advantageously provide DFOS and WDM communications over amplified, multi-span optical WDM optical telecommunications facilities using all Raman amplification and coding schemes. Our all-Raman amplification operates stably—without isolators—and provides sufficient gain to compensate for fiber span loss for both DFOS signals and WDM channel signals—at the same time. Furthermore, our inventive techniques employ signal coding, such as MB-TGD-OFDR for DAS, and we operate our DFOS operation power at a much lower power level as compared to pulse interrogation techniques. With improved OSNR and reduced power using signal coding along with our distributed Raman amplification, our DFOS systems can co-exist with WDM communication channels on the same amplified multi-span fiber optic links over great distances.

2 Claims, 8 Drawing Sheets

(56) References Cited

U.S. PATENT DOCUMENTS

| | | | |
|---|---|---|---|
| 11,320,302 B2 * | 5/2022 | Cedilnik | G01D 5/35361 |
| 2014/0078506 A1 * | 3/2014 | Hu | G01M 11/3118 356/445 |
| 2020/0136722 A1 * | 4/2020 | Urban | H04B 10/0779 |
| 2020/0370948 A1 * | 11/2020 | Huang | G01H 9/004 |
| 2021/0314063 A1 * | 10/2021 | Huang | G02B 6/022 |
| 2023/0283385 A1 * | 9/2023 | Ip | H04B 10/071 398/115 |
| 2023/0375398 A1 * | 11/2023 | Hu | H04B 10/2507 |

* cited by examiner

LONG DISTANCE DISTRIBUTED FIBER OPTIC SENSING (DFOS) AND WDM COMMUNICATIONS OVER REPEATED FIBER SPANS USING ALL-RAMAN AMPLIFICATION AND CODING SCHEMES

CROSS REFERENCE

This application claims the benefit of U.S. Provisional Patent Application Ser. No. 63/311,497 filed 18 Feb. 2021 the entire contents of which being incorporated by reference as if set forth at length herein.

TECHNICAL FIELD

This disclosure relates generally to distributed fiber optic sensing (DFOS) and wavelength division multiplexed (WDM) telecommunications over a common optical fiber over long distances including repeated fiber spans using all-Raman amplification and coding schemes.

BACKGROUND

As those skilled in the art will understand and appreciate, distributed fiber optics sensing (DFOS) employs backward scattering mechanisms in optical fibers, such as Rayleigh, Brillouin, and Raman scattering, to sense the environmental surroundings of the optical fiber cables. Until the present, DFOS system deployment has mainly employed single-span fiber links without repeaters, as it is difficult to achieve the required optical signal-to-noise ratio (OSNR) for DFOS in multi-span fiber links with inline amplification. Furthermore, inline amplifiers typically used in optical fiber communication networks only allow for one-way signal propagation. These in-line amplifiers, typically based on erbium-doped fiber amplifiers (EDFAs), would require cost-prohibitive redesign to allow DFOS signals to route back to an interrogator node. Consequently, systems, methods, and structures that facilitate the development of amplified, multi-span optical fiber facilities providing DFOS and data communications over a common optical fiber would be a welcome addition to the art.

SUMMARY

An advance in the art is made according to aspects of the present disclosure directed to a coded DFOS system operating over amplified, multi-span, optical WDM telecommunications facilities.

In sharp contrast to the prior art, systems, method, and structures according to aspects of the present disclosure employ distributed Raman amplification for amplifying DFOS signals over multiple amplified fiber spans. In further contrast to the prior art, our all-Raman amplification operates stably—without isolators—and provides sufficient gain to compensate for fiber span loss for both DFOS signals and WDM channel signals—at the same time.

Furthermore, our inventive techniques employ signal coding, such as MB-TGD-OFDR for DAS, and we operate our DFOS operation power at a much lower power level as compared to pulse interrogation. The operation power is directly related to the amount cross-talks affecting the co-propagating WDM channels, which can cause burst errors even after forward-error correction (FEC). With improved OSNR and reduced power using signal coding along with our distributed Raman amplification, DFOS can co-exist with WDM communication channels on the same amplified multi-span fiber optic link.

BRIEF DESCRIPTION OF THE DRAWING

A more complete understanding of the present disclosure may be realized by reference to the accompanying drawing in which:

FIG. 5(A) and FIG. 5(B) are a pair of plots showing Post-FEC bit error rates (BERs) of communication channels impacted by neighboring sensing signal at different peak power levels using FIG. 5(A) pulse DAS; and FIG. 5(B) coded DAS, according to aspects of the present disclosure;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ration (SNR) of Rayleigh-scattering based system (e.g. distributed acoustic sensing or DAS) and Brillouin-scattering based system (e.g. Brillouin optical time domain reflectometry or BOTDR).

As currently implemented in contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber.

One of the greatest challenges in integrating sensing and communication signals on the same fiber as noted previously is the nonlinear cross-talk that occurs between the sensing and communications signals. One reason is that the instantaneous operation power of the DFOS signals is much higher as compared to the communications signals (channels), thus degrading communications performance due to fiber nonlinearity. Implementing a signal coding in DFOS allows reduction of the instantaneous operation power in the interrogation signal, however, there still exists a large power fluctuation in the beginning and the falling edges of the code sequence—which in turn leads to cross phase modulation (XPM) distortion on neighboring wavelength division multiplexed (WDM) communication channels.

Yet another difficulty when applying a coding to a DFOS system is the signal amplification. As is known and understood, an erbium-doped fiber amplifier (EDFA) arguably remains the best medium for optical signal amplification and as a result they are widely used in communications fibers. With respect to a possible signal coding noted, as the length of a code sequence increases, however, it approaches the carrier recovery time of the erbium atoms. As a result, an amplified output signal will exhibit an uneven amplitude profile and the code sequence will experience a decreasing gain over the period of the whole sequence. If uncorrected, the uneven amplitude profile will affect the auto-correlation function of the implemented code and cause signal crosstalk between different fiber segments in the DFOS system.

Figure 1:
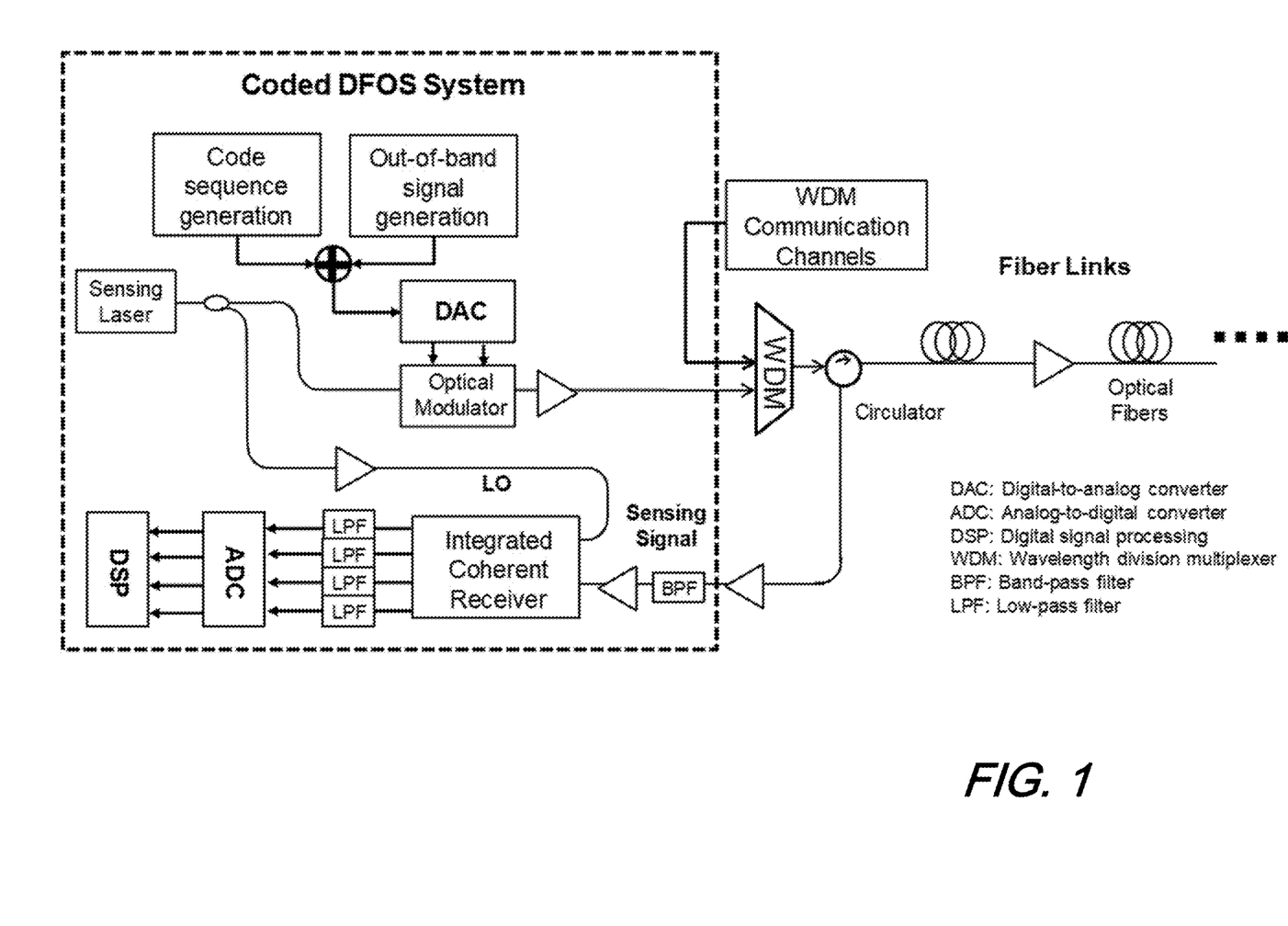
FIG. 1 is a schematic diagram illustrating a coded constant-amplitude DFOS system with out-of-band signal generation according to aspects of the present disclosure.

FIG. 1 is a schematic block diagram of a coded constant-amplitude DFOS system with out-of band signal generation according to aspects of the present disclosure. In the depicted block diagram, we illustratively show how out-of-band signal generation will be applied to the DFOS system according to aspects of the present disclosure.

Operationally, we assume that the DFOS system will be Rayleigh-scattering based system (e.g. distributed acoustic sensing or DAS) and Brillouin-scattering based system (e.g. Brillouin optical time domain reflectometry or BOTDR) with a coding implementation. With such coding designs, these systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and the change in the response is then identified and interpreted for sensor readouts.

Figure 2:
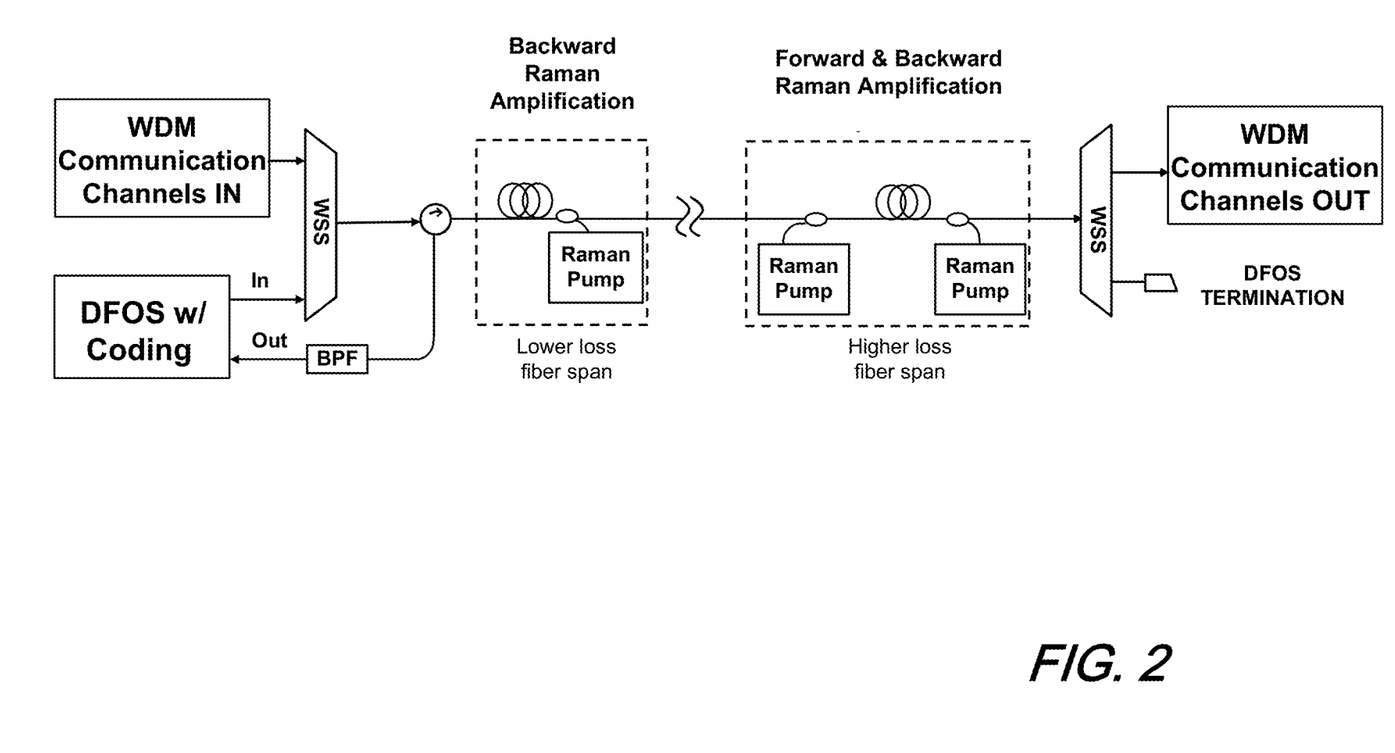
FIG. 2 is a schematic diagram illustrating an all-Raman amplification scheme supporting DFOS and WDM fiber communications over multiple amplified fiber spans according to aspects of the present disclosure.

FIG. 2 is a schematic diagram illustrating an all-Raman amplification scheme supporting DFOS and WDM fiber communications over multiple amplified fiber spans according to aspects of the present disclosure.

As shown in FIG. 2, a multi-span fiber link is amplified by multiple distributive Raman amplifiers to support both DFOS operation and WDM communication channels. The DFOS system can be coherent optical time-domain reflectometry (OTDR) using Rayleigh backscatter which is used for (DAS), or a Brillouin-based OTDR for temperature or strain sensing. Signal coding may be employed to provide sufficient optical signal to noise ratio (OSNR) gain to mitigate fiber loss resulting from a typical span distance of ~80-km, as well as any additional asynchronous spontaneous emission (ASE) noise contributed by multiple optical amplifiers.

At the interrogation node, to support sensing and communication using the same fiber and amplification equipment, the DFOS signal is multiplexed with the communication channels via WDM, which can be easily performed using a standard wavelength selective switch (WSS). The circulator required for routing back the sensing signal back to the DFOS interrogator can be placed after the WSS to avoid the insertion loss of the WSS. An optical bandpass filter (OBF) is used to block off the reflections of all the other WDM channels before the sensing signal is detected by the DFOS receiver. At the destination node, the DFOS signal can also be demultiplexed from the WDM channels using WSS and then terminated to avoid high backward reflection.

In our scheme, all accumulated losses in the fiber spans are compensated by our all-Raman amplification technique. This is in sharp contrast to Erbium doped fiber amplification, which is a "lump amplification" and unstable when operated without a directional isolator, Raman amplification is distributive and can operate stably with bidirectional signal propagation. This feature is the key in supporting DFOS over multi-span fiber links. All Raman amplification can provide enough gain to wide optical bandwidths for WDM communication, making it as well suited for an integrated optical sensing and communication system.

In those instances where span loss is low, only a backward pumping Raman amplifier is needed to compensate for the span loss. When the span loss is higher than the gain provided by the backward Raman pump, typically ~20-dB, a forward pumping Raman amplifier can also be used in combination.

Similarly to data transmission in fiber, achievable range for DFOS is limited by OSNR at long distances, and inline amplification is required to achieve operation over multiple fiber spans. Inline amplification for long-haul fiber optic links typically uses EDFAs which have isolators at the outputs to avoid undesirable effect from reflections, and thus won't work for DFOS. In some design, such as submarine communication cables, it is possible to route the backscattering signal at certain wavelength to a different fiber which supports propagation in the opposite direction. A previous IR have detailed how a redesign of an EDFA-based repeater to support DFOS operation at multi-span links, incorporating optical bandpass filters, optical multiplexers/demultiplexers, optical switches and photodiodes. However, even with a dedicated couple path for signal route-back, such repeater redesign is costly for implementation.

As those skilled in the art will understand and appreciate, Raman amplification is commonly used in single-span DFOS system. It is typically used in a forward pumping configuration to maintain signal OSNR at ~40-km, however it is not enough to provide enough OSNR gain to reach typical fiber span length of 80-km. With signal coding design such as MB-TGD-OFDR (IR 20008), OSNR gain is possible to compensate the large fiber span link loss, making a multi-span DFOS system possible.

According to aspects of the present disclosure, all Raman amplification provides two differentiating features. First, it allows for bidirectional operation of DFOS in a multi-span fiber link, with Raman pumps injected either from the backward, or forward direction, or both. In addition, the Raman pumps are shared among an integrated system including both WDM communication channels and DFOS, so the implementation cost is reduced. Such a configuration does not require dedicated signal coupled path, or costly amplifier re-designs.

The integrated multi-span fiber sensing and communication system, amplified using all Raman scheme, started out with WDM multiplexing of the DFOS signal and communication channels.

Figure 3:
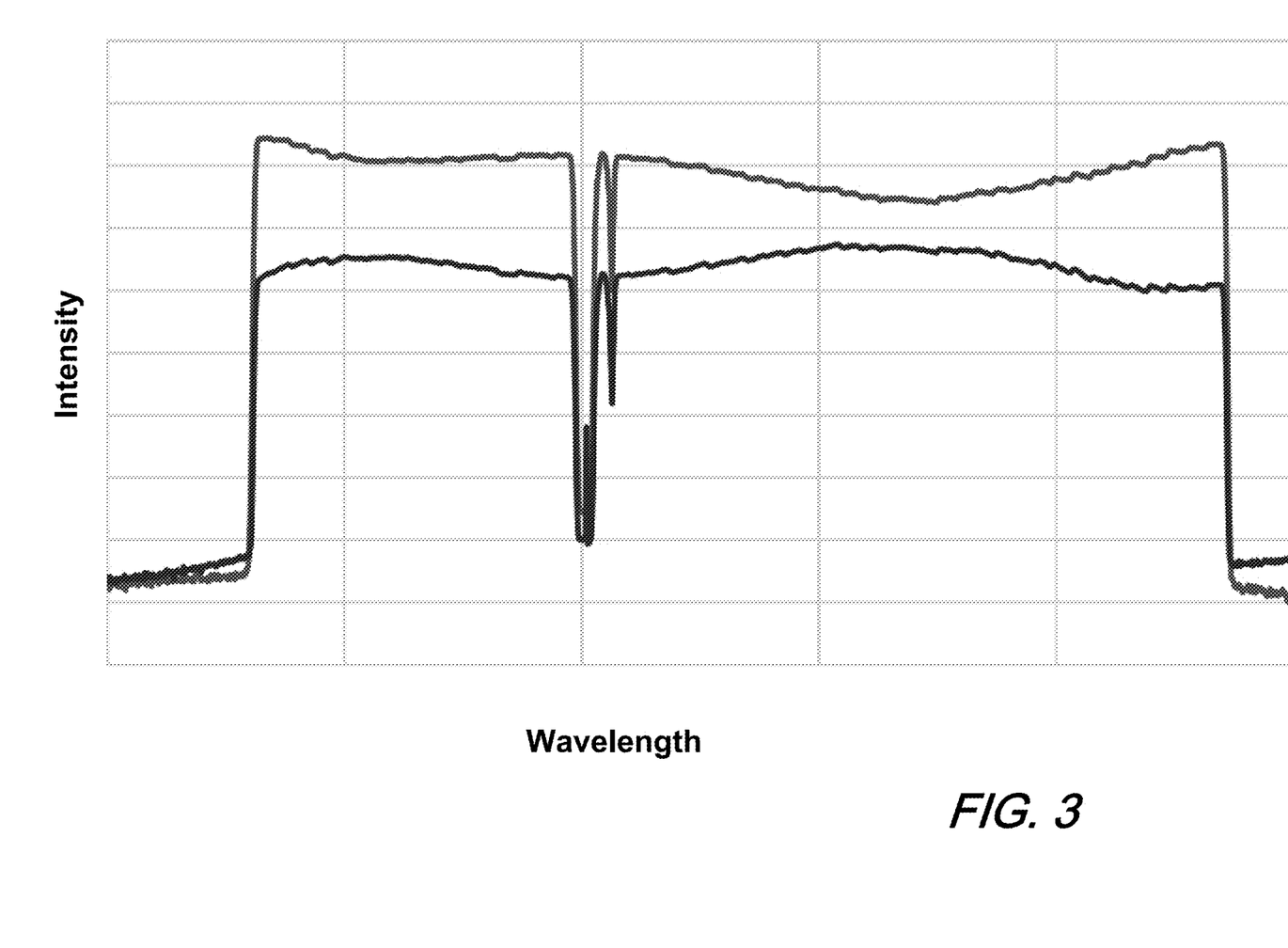
FIG. 3 is a schematic plot illustrating WDM multiplexing of communications channels and DFOS signals according to aspects of the present disclosure.

FIG. 3 is a schematic plot illustrating WDM multiplexing of communications channels and DFOS signals according to aspects of the present disclosure where a MB-TGD-OFDR signal at 1550.12-nm, a 200-Gb/s DP-16QAM data channel at 1550.52-nm, and an emulated WDM transmission signal band of 2.5-THz emulated using ASE noise source, are multiplexed together using a commercially available WSS using standard 50-GHz grid. The multiplexed signal can then be launched into the same fiber link with multiple spans, with each span loss compensated by all-Raman amplification. Shown are a multiplexed signal spectrum at the interrogator node, and a signal spectrum after transmission over 13-spans of optical fiber.

Figure 4:
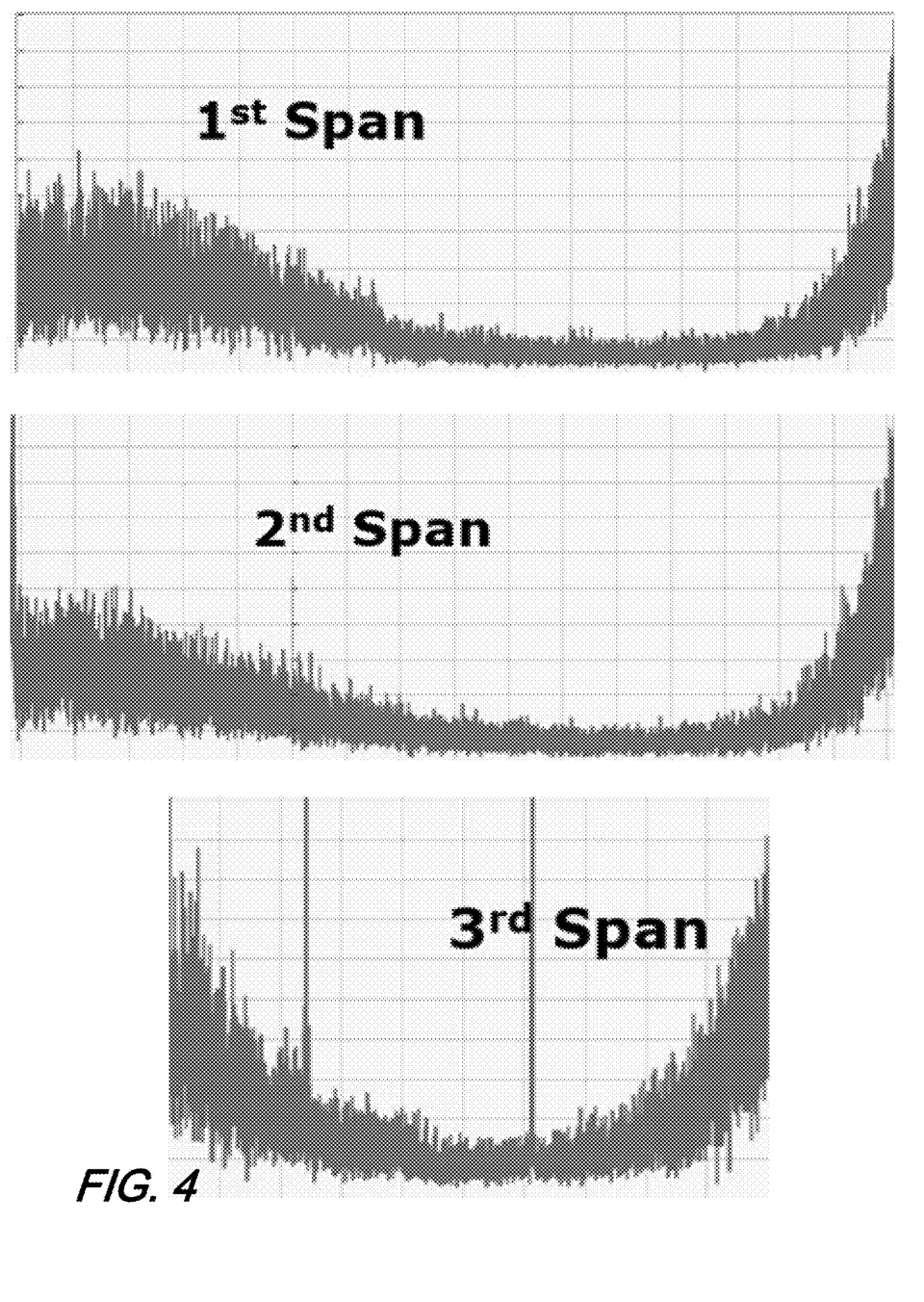
FIG. 4 are a series of plots showing illustrative DFPS signal evolution in an all-Raman amplified fiber link across a first span, a second span, and a third span according to aspects of the present disclosure.

FIG. 4 are a series of plots showing illustrative DFPS signal evolution in an all-Raman amplified fiber link across a first span, a second span, and a third span according to aspects of the present disclosure. We show in this figure a typical DFOS signal evolution profile in a three span fiber link, supported by all Raman amplification. The $1^{st}$ and $2^{nd}$ span included 80-km of optical fibers with ~20-dB span loss, and are being pumped by Raman amplifiers in both forward and backward direction. The $3^{rd}$ span is a short span section having a 50-km fiber length, which is pumped using backward Raman amplifier only.

Using coding scheme such as MB-TGD-OFDR for DFOS is also important not only for combating OSNR degradation due to larger fiber loss as well amplifier noise. The peak power operation point of DFOS with coding scheme are typically much lower than traditional pulse based DFOS.

Figure 5A:
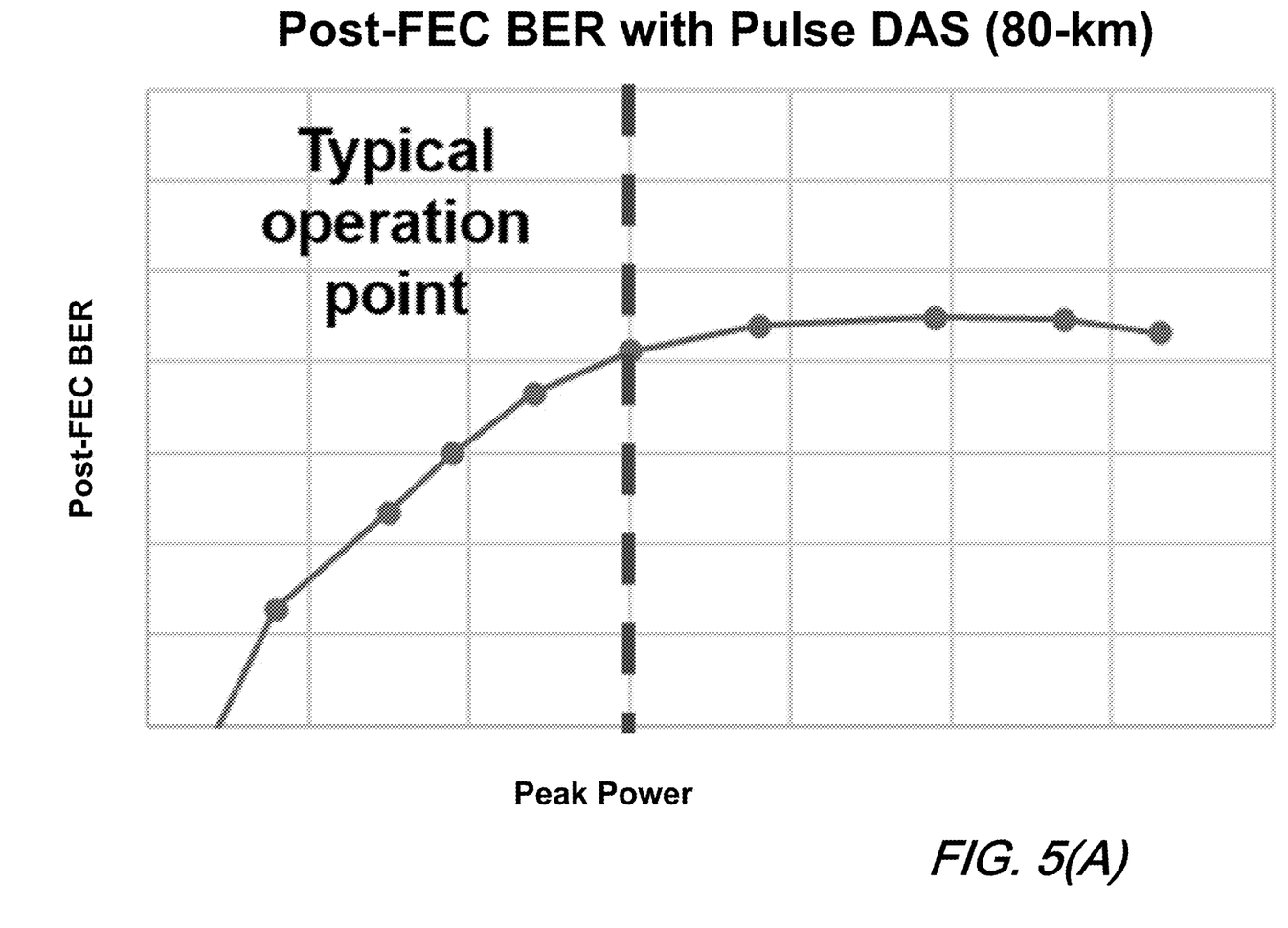
Figure 5B:
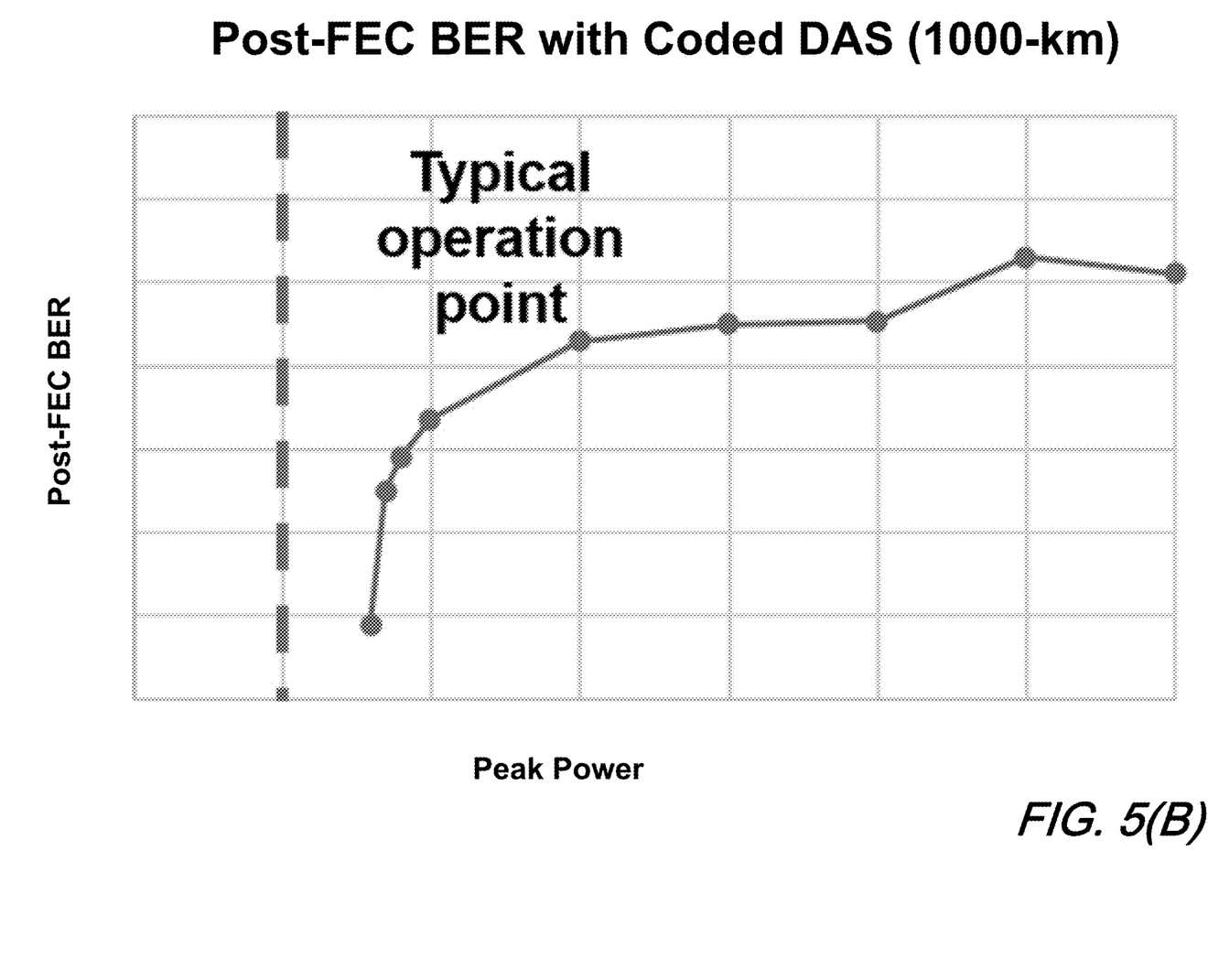

FIG. 5(A) and FIG. 5(B) are a pair of plots showing Post-FEC bit error rates (BERs) of communication channels impacted by neighboring sensing signal at different peak power levels using FIG. 5(A) pulse DAS; and FIG. 5(B) coded DAS, according to aspects of the present disclosure.

In these figures, we show how the transmission performance of a 200 G 16QAM system impacted by neighboring DAS signal. Using traditional pulse DAS (typical reach of 50-km) over an 80-km fiber span, it will incur burst errors which can't be corrected by the transponder's FEC due to the DAS's high peak power at its typical operating point. When using a DAS with MB-TGD-OFDR coding, even after 1000-km co-propagation with the 200 G channels, the received channel is still error due to the lower peak power operation point. Schemes like out-of-band signal additional can also be employed to further reduce NL impacts to neighboring WDM channels.

Those skilled in the art will understand and appreciate that time-gated digital optical frequency-domain reflectometry (TGD-OFDR) is one of coding technique that can be used to increase signal-to-noise ratio (SNR) in distributed acoustic sensing (DAS) by signal correlation. By interrogating an optical fiber-under-test (FUT) with chirped pulses:

$$x(t) = \sqrt{P} \exp\left(j2\pi\alpha\frac{t^2}{2}\right) rect\left(\frac{t}{T_c}\right) \quad (1)$$

where $T_c$ is the chirp duration, $\alpha$ is the chirp rate, and $\sqrt{P}$ is the amplitude of the envelope, the total energy launched into the fiber per interrogation is $\varepsilon = P \cdot T_c$, while bandwidth of the interrogation signal x(t) is $B_W = \alpha T_c$.

Compared with optical time-domain reflectometry (OTDR) at the same peak power (which is limited by fiber nonlinearity) and bandwidth, but which uses pulses $$p(t) = \sqrt{P}\, rect\left(\frac{t}{T}\right)$$

of duration T and bandwidth $B_W=1/T$, the energy of the interrogation signal in TGD-OFDR is $$\frac{T_c}{T} = \frac{1}{\alpha T^2}$$

times higher than OTDR. Hence, the power of the received Rayleigh backscatter and SNR also scales accordingly as $T_c=1/\alpha T$.

Figure 6:
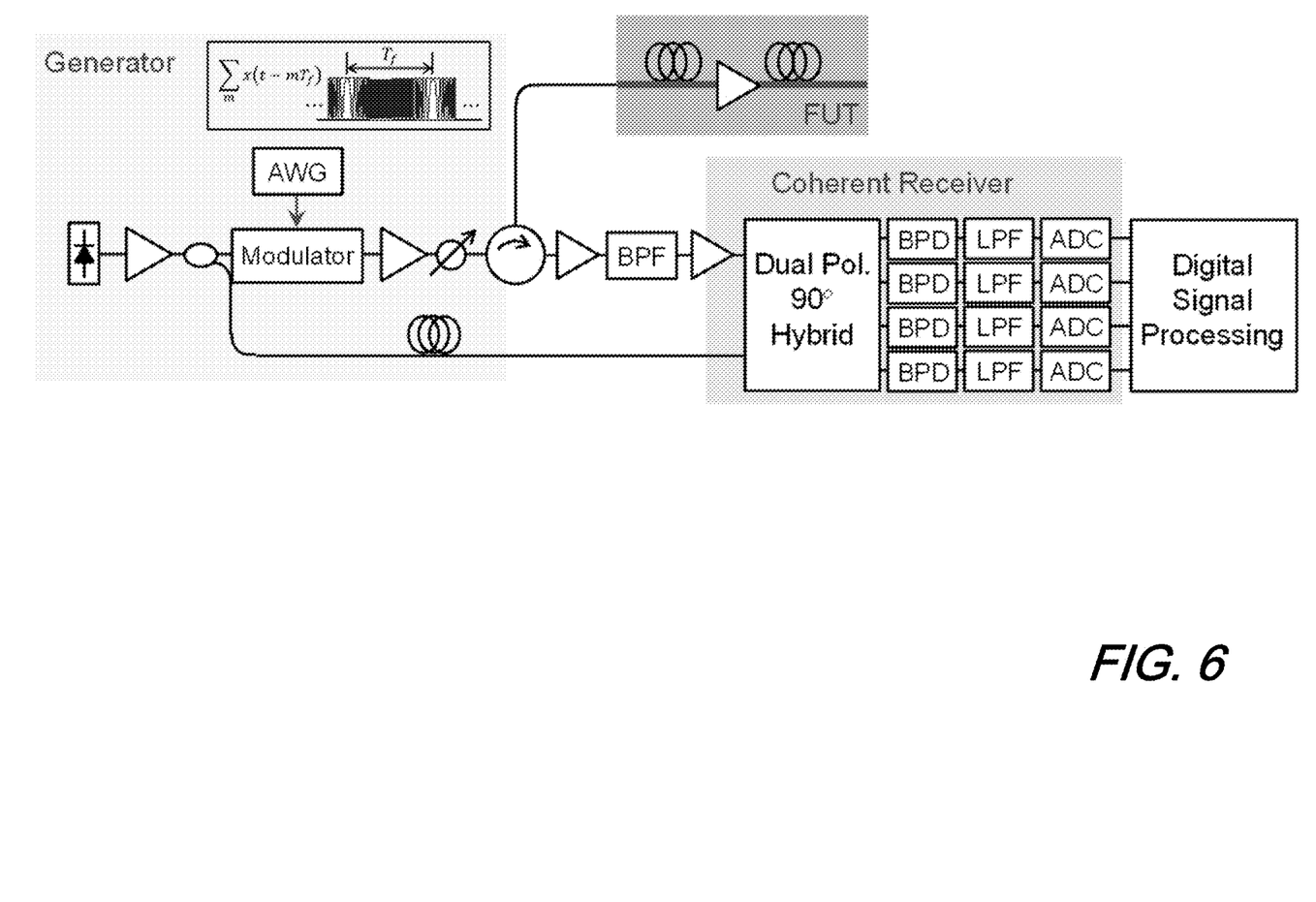
FIG. 6 shows a schematic diagram of an illustrative architectural arrangement of a correlation-based DAS interrogator including a generator that launches chirped pulses into a fiber under test (FUT), and detects by a coherent receiver Rayleigh backscatter, according to aspects of the present disclosure.

FIG. 6 shows a schematic diagram of an illustrative architectural arrangement of a correlation-based DAS interrogator including a generator that launches chirped pulses into a fiber under test (FUT), and detects by a coherent receiver Rayleigh backscatter, according to further aspects of the present disclosure.

Consider the canonical architecture of a correlation-based DAS shown in FIG. 6 where a dual-polarization coherent receiver is used to detect the Rayleigh backscatter. When TGD-OFDR is applied in the absence of any phase modulation by laser phase noise or mechanical vibration of the FUT, received signal is:

$$y(t) = \int_0^L h(z) \times \left(t - \frac{2z}{v_g}\right) dz + n(t) \quad (2)$$

where $h(z)=[h_x(z)\; h_y(z)]^T$ is the Jones' vector for the Rayleigh impulse response, n(t) is the equivalent additive white Gaussian noise (AWGN) added by the receiver and by any inline amplifiers along the FUT, and $v_g$ the group velocity of the fiber at the wavelength $\lambda$ of the sensing channel. By letting $t'=2z/v_g$, Eq. (2) may be recast as a linear convolution:

$$y(t) = \int_0^{T_L} g(t') \times (t-t')\, dt' = g(t) \otimes x(t) + n(t) \quad (3)$$

where $$g(t) = \frac{v_g}{2} h\left(\frac{v_g}{2} t\right)$$

is the Rayleigh impulse response in time-domain, and $T_L=2n_{eff}L/c$ is the round-trip propagation time of the FUT.

The Rayleigh impulse response may be estimated by correlating the y(t) with the complex conjugate of the TGD-OFDR signal:

$$\hat{g}(t) = x^*(t)*y(t) = x^*(-t) \otimes y(t). \quad (4)$$

This operation relies on the good autocorrelation property of chirped pulses:

$$R_{xx}(t) = x^*(t)*x(t) = (T_c - |t|)\, sinc(\alpha t(T_c - |t|)), \quad (5)$$

For long chirps $T_c \gg T$, Eq. (5) has a main lobe with duration $T=1/\alpha T_c$, which is the same width as the rectangular pulse used in OTDR. We have:

$$R_{xx}(t) \approx T_c\, sinc\left(\frac{t}{T}\right), \quad (6)$$

The correlation output of Eq. (3) is thus approximately equal to the time-domain Rayleigh impulse response g(t) filtered between frequencies $\pm\tfrac{1}{2}T$, multiplied by a gain of $T_c$. Thus, it appears as if the SNR performance of TGD-OFDR can be improved linearly without limit by increasing the chirp duration $T_c$, due to increased energy launched into the FUT.

In practice, however, the use of very long chirp duration is susceptible to distortion by phase modulation on both the outbound interrogation signal as well as the inbound Rayleigh backscatter. Consider first the impact of vibration of the FUT on outbound signal.

Let $\epsilon(z;t)$ denote the longitudinal fiber strain at position z and time t. When the outbound signal reaches z, it is given by:

$$x_z(t) = x\left(t - \frac{z}{v_g}\right) \exp\left(-jk \int_0^z \epsilon\left(z'; t - \frac{z}{v_g} + \frac{z'}{v_g}\right) dz'\right) \quad (7)$$

where $k=2\pi n_{eff}/\lambda$ is the propagation constant, and $n_{eff}$ is the fiber's effective index of refraction at the wavelength of the sensing channel.

We observe that the original signal x(t) has been phase-modulated by accumulated longitudinal strain. The Rayleigh reflection of amplitude h(z) at position z will contribute a reflected signal of:

$$y_z(t) = \left\{ h(z) \cdot x_z\left(t - \frac{z}{v_g}\right) \right\} \exp\left(-jk\int_0^z \epsilon\left(z'; t - \frac{z'}{v_g}\right)dz'\right)$$

$$= \left\{ h(z) \cdot \left[ x\left(t - \frac{2z}{v_g}\right) \exp\left(-jk\int_0^z \epsilon\left(z'; t - \frac{2z}{v_g} + \frac{z'}{v_g}\right) dz'\right) \right] \right\} \exp\left(-jk\int_0^z \epsilon\left(z'; t - \frac{z'}{v_g}\right) dz'\right).$$

The total received signal (ignoring noise contributions) can be found by summing all the infinitesimal reflections $y_z(t)$:

$$y(t) = \int_0^L y_z(t)\, dz \quad (9)$$

$$= \int_0^{T_L} g(t') \cdot \left[ x(t-t') \exp\left(-jk\int_0^{\frac{v_g t'}{2}} \epsilon\left(z'; t - t' + \frac{z'}{v_g}\right) dz'\right) \right]$$

$$\exp\left(-jk\int_0^{\frac{v_g t'}{2}} \epsilon\left(z'; t - \frac{z'}{v_g}\right) dz'\right) dt'$$

Compared with the simple convolution in Eq. (3), the received signal in Eq. (9) is distorted by two phase modulations on the both the outbound signal and the inbound Rayleigh backscatter due to time-varying longitudinal strain. The result is that correlation by x*(t) in Eq. (3) will produce a distorted ĝ(t), as the sin c(•) autocorrelation property of in Eq. (6) no longer holds.

The impact of phase distortion on DAS is "spatial leakage," where vibration at $z_v$ will leak to fiber positions $z > z_v$.

We experimentally evaluated spatial leakage with an example from a DAS experiment conducted on a FUT where a piezoelectric transducer (PZT) is inserted between two spools of 50-km and 25-km standard single-mode fiber (SSFM). The experiment used a chirped pulse of duration of $T_c$=50 μs and a chirp width 1/T=10 MHz (spatial resolution $\Delta z = (c/2n_{eff})T \approx 10$ m).

The PZT included 12 m of fiber wound on a piezoelectric ring, and had a slope of 0.8 rad/V. In this experiment, the PZT was driven with a sine wave of 10 V amplitude (phase amplitude $\Phi_0 \approx 8$ rad) at a frequency of $f_{vib}$=110 Hz. The DAS interrogator launched chirped pulses at a frame rate of 1,000 Hz.

Since the DAS samples distributed vibration at a frame rate of $1/T_f$=1,000 Hz, higher-order harmonics of $\exp(j\Phi_0 \cos(2\pi f_{vib} t + \theta))$ are aliased around the Nyquist frequency of $\frac{1}{2}T_f$=500 Hz. It was observed that the 110 Hz vibration is not merely confined to the location of the PZT (z=50 km) but leaks to all fiber positions after the PZT.

We note that the deleterious effect of multiplicative phase noise interacting with convolution by a linear impulse response is analogous to the phenomenon of equalization-enhanced phase noise (EEPN) previously observed in telecommunications. In EEPN, the multiplicative phase noise is that of the local oscillator laser, while the linear operator is the inverse chromatic dispersion (CD) of the fiber channel. It is known that the longer the duration of the CD, the more severe the impact of EEPN.

In Eq. (9) for phase distortion in TGD-OFDR, the variable to be detected is g(t') while the multiplicative phase noise is over x(t). Nevertheless, the same reasoning applies that the longer the duration of x(t), the worse the phase distortion. This appears to place a limit on the longest usable chirp duration $T_c$—vibration-induced phase distortion favors the use of shorter chirp durations.

Reducing the impact of spatial leakage in DAS caused by vibration-induced phase modulation on long chirped pulses using a multiband digitally fragmented signal processing architecture. By truncating the transmitted chirped pulse into a series of shorter pulses and processing them as distinct frequency channels, spatial leakage is reduced at the expense of reduced spatial resolution. However, we also propose that spatial resolution can be restored by chirping faster and using a wider bandwidth receiver.

One particularly distinguishing aspect of systems, methods, and structures according to aspects of the present disclosure may include our innovative digital signal processing architecture, where instead of processing a transmitted chirped pulse as a single sequence, we use a parallel fragmented multiband architecture, where each tributary correlates the received signal with a truncated chirped pulse to obtain the Rayleigh impulse response over its frequency band. Advantageously, by reducing the duration of the chirp processed by each tributary, spatial leakage is reduced at all the tributaries, thus even after combining all the interferometric products from all tributaries using a rotated vector sum, the resultant signal is much less impacted by spatial leakage than by using a conventional, prior art TGD-OFDR method.

Of further advantage, our DSP architecture is also quite flexible, as the number of fragmented tributaries to use at the receiver is independent of the chirped pulse generator—i.e., the generator can always transmit the same signal, it is up to the receiver how to process the Rayleigh backscatter output to trade-off between good spatial resolution and low spatial leakage.

To mitigate against vibration-induced phase distortion on long chirped pulses, the multiband digitally fragmented OFDR (MB-DF-OFDR) we proposed will employ a digital signal processing architecture which partitions the chirped sequence x(t) into a concatenation of $N_b$ shorter chirp sequences $x_b(t)$, where:

$$x_b(t) = \sqrt{P} \exp\left(j 2\pi\alpha \frac{t^2}{2}\right) rect\left(\frac{t - \tau_b}{T_c/N_b}\right), \text{ for } b = 1, \ldots, N_b. \quad (10)$$

We note that a long chirp sequence of duration $T_c$ and bandwidth $\alpha T_c$ into $N_b$ shorter chirp sequences, each of duration $\alpha T_c/N_b$ and duration $T_c/N_b$, and a plot of a time-domain representation of a real part of $x(t) = \sqrt{P} \exp(j2\pi\alpha(t^2/2))$ for $-T_c/2 \leq t < +T_c/2$, shows an instantaneous frequency of x(t), i.e., $f(t) = \alpha t$ for $-T_c/2 \leq t < +T_c/2$.

With respect to this, we note that each $x_b(t)$ has duration $T_c/N_b$ and is centered around delay $\tau_b = -T_c/2 + (2b-1)(T_c/2N_b)$, and occupies frequency band $$-\frac{\alpha T_c}{2} + (b-1)\frac{\alpha T_c}{N_b} \leq f_b \leq -\frac{\alpha T_c}{2} + b\frac{\alpha T_c}{N_b},$$

with $\bar{f}_b = \alpha \tau_b$ being the center of each band. The $x_b(t)$ are also merely frequency-shifted and delayed copies of the same truncated chirped pulse:

$$x_{tr}(t) = \sqrt{P} \exp\left(j 2\pi\alpha \frac{t^2}{2}\right) rect\left(\frac{t}{T_c/N_b}\right) \quad (11)$$

$$x_b(t) = x_{tr}(t - \tau_b) \exp(j(2\pi f_b t + \theta_b)) \quad (12)$$

Thus, it is possible to recover the Rayleigh impulse response $\hat{g}_b(t) = [\hat{g}_{b,x}(t) \ \hat{g}_{b,y}(t)]^T$ for each frequency band $f_b$ by first frequency shifting the received signal y(t) by $-\bar{f}_b$, then correlating with $x_{tr}(t)$, followed by undoing the delay $\tau_b$.

Interferometric products between different polarization combinations (k, l) ∈ {x, y} of $\hat{g}_b(t)$ are then computed at a gauge length of $\Delta t_g$:

$$\zeta_{b,kl}(t) = \hat{g}_{b,k}(t + \Delta t_g) \hat{g}_{b,l}^*(t) \quad (13)$$

These $4N_b$ interferometric product terms $\zeta_{b,kl}(t)$ can then be optimally combined using a rotated vector sum to obtain $\zeta(t)$. The unwrapped angle $\angle \zeta(t)$ is proportional to the cumulative strain between fiber positions $z = (v_g/2)t$ and $z + \Delta z_g = (v_g/2)(t + \Delta t_g)$.

Preserving Spatial Resolution

A drawback of partitioning x(t) into $N_b$ shorter chirp sequences is that each $\hat{g}_b(t)$ will have bandwidth $\alpha T_c/N_b = 1/N_b T$, thus the spatial resolution of the resulting DAS is likewise reduced by a factor of $N_b$ from the original $(c/2n_{eff})T$ to $(c/2n_{eff})N_b T$. Depending on the application, this loss of spatial resolution may or may not be desirable.

One way to retain the original spatial resolution is to increase the chirp rate by factor $N_b$, resulting in the interrogation signal having a determined instantaneous frequency profile. To make the transmitted signal have constant envelope, therefore avoiding issues with amplifier gain transients, the rest of the frame is filled with out-of-band chirp, resulting in the transmission of the following signal over each frame:

$$x(t)=\sqrt{P}\exp(j2\pi\int_0^t f(t')dt'), \text{ for } 0\le t<T_f. \tag{14}$$

Since for $T_c \le t < T_f$ in each frame, the instantaneous frequency f(t) is outside the bandwidth of the receiver, the out-of-band chirp does not impact signal processing on the received signal. By chirping at an increased rate of $N_b\alpha$, the bandwidth covered by the truncated chirped pulse $x_{tr}(t)$ is restored to $\alpha T_c = 1/T$, hence spatial resolution is restored to $(c/2n_{eff})T$. Furthermore, as the duration of $x_{tr}(t)$ is $T_c/N_b$, while the noise associated with $x_{tr}*(t)*(y(t)\exp(-j2\pi f_b t))$ covers a bandwidth of 1/T, the SNR of each channel estimate $\hat{g}_b(t)$ is $1/N_b$ times that of conventional TGD-OFDR. After combining interferometric products from $N_b$ tributaries, each with independent noises, the rotated sum vector $\zeta(t)$ will have the same SNR as conventional TGD-OFDR.

One drawback with the MB-DF-OFDR approach is that the coherent receiver optics and ADCs needs to have sufficient bandwidth to have $N_b$ the bandwidth to recover all $N_b$ bands. There are also $N_b$ tributaries to process, which increases DSP complexity. However, the increase in DSP complexity is less than linear since each $x_b*(t)$ has shorter duration, and the downstream processing after obtaining $\zeta(t)$ is the same as conventional TGD-OFDR.

As noted previously, our multiband DF-OFDR scheme uses the same physical hardware as conventional TGD-OFDR as is shown in FIG. 6. A low-linewidth continuous-wave (CW) laser is modulated with x(t) using any standard method such as an arbitrary waveform generator (AWG) driving a Mach-Zehnder I/Q Modulator. The modulated signal is amplified to the correct power level and is launched into the FUT through a circulator. The Rayleigh backscatter is received on the third port of the circulator, which is amplified and filtered, before coherent detection using the same CW laser which generated the outbound interrogation signal as the local oscillator (LO). We assume a standard coherent receiver front-end comprising a dual-polarization 90° optical hybrid followed by balanced photodetectors (BPD), followed by anti-aliasing filtering to reject out-of-band chirp, followed by sampling and digitization by analog-to-digital converters (ADC). The ADC sampling rate $T_{adc}$ should be sufficient to recover all $N_b$ frequency bands without aliasing.

Figure 7:
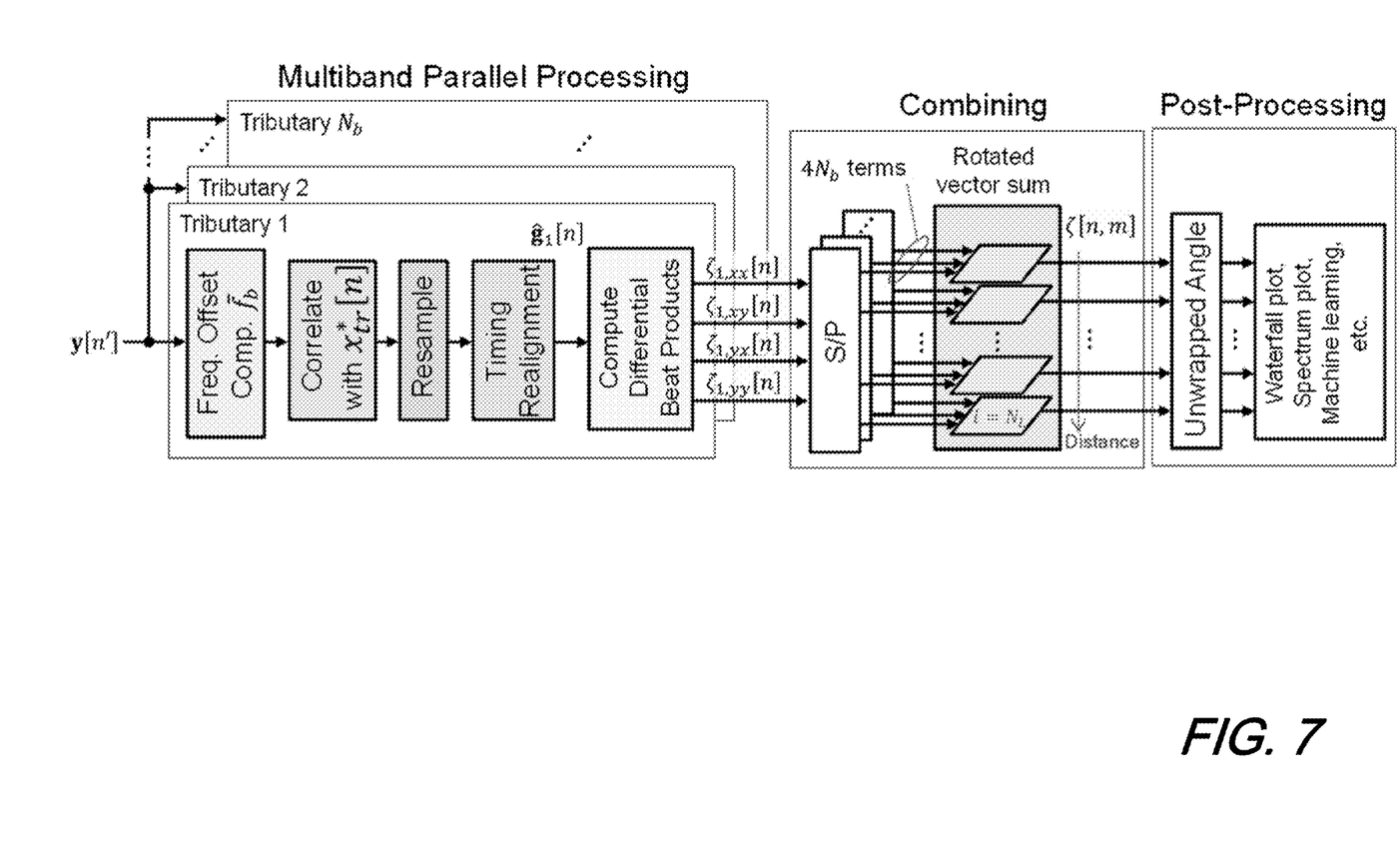
FIG. 7 shows a schematic diagram of an illustrative DSP architecture for MB-DF-OFDR according to aspects of the present disclosure.

FIG. 7 shows a schematic diagram of an illustrative DSP architecture for MB-DF-OFDR according to aspects of the present disclosure. With reference to that figure, we note that the digitized waveform $y[n] \triangleq y(nT_{adc})$ recovered from the coherent receiver is processed in $N_b$ parallel tributaries.

In tributary b, the received signal is first frequency downshifted by $\tilde{f}_b$ followed by correlation with $x_{tr}*[n] \triangleq x_{tr}*(N'T_{adc})$ to recover the estimated $\hat{g}_b[n']$—the Rayleigh impulse response for frequency band $f_b$. As $\hat{g}_b[n']$ only has bandwidth $1/N_b T$, it is downsampled to a lower rate of $1/T_s$, followed by timing realignment by $-n_b = -\tau_b/T_s$ samples for each subband.

As the interrogator transmits the chirped sequence $\sum_{m=-\infty}^{+\infty} x(t-mT_f)$ at a frame rate of $T_f = N_f T_s$, the correlation receiver output is periodic—i.e., $$\hat{g}_b[n+mN_f] \approx \frac{v_g}{2} h_b\left(\frac{v_g}{2}nT_s\right)$$

is an estimator of the Rayleigh impulse response for frequency band $f_b$ at fiber position $$\frac{v_g}{2}nT_s$$

during the transmission of the m-th frame. Interferometric products at a pre-determined gauge length of $\Delta z_g = (v_g/2)\Delta nT_s$ are then computed for the four combinations of polarizations (k, l) ∈ {x, y}:

$$\zeta_{b,kl}[n] = \hat{g}_{b,k}[n+\Delta n]\hat{g}_{b,l}^*[n]. \tag{15}$$

The $4N_b$ time-aligned interferometric products are combined into a rotated sum vector $\zeta[n]$. One method to accomplish this is to first parallelize $\zeta_{b,kl}[n]$:

$$\zeta_{b,kl}^p[n,m] \triangleq \zeta_{b,kl}[n+mN_f] \tag{16}$$

where n and m are the distance index and frame index, respectively. At each distance index n, the strongest interferometric product is selected:

$$(b_n, k_n, l_n) = \max_{b,k,l}\left\{\sum_m |\zeta_{b,kl}^p[n,m]|^2\right\} \tag{17}$$

The angle of all the other interferometric products relative to $\zeta_{b_n,k_n,l_n}^p$ are computed via an inner product, followed by a rotated vector sum operation to obtain $\zeta[n, m]$:

$$\phi_{b,kl,n} = \angle\left(\sum_m \zeta_{b,kl}^p[n,m](\zeta_{b_n,k_n,l_n}^p[n,m])^*\right) \tag{18}$$

$$\zeta[n,m] = \sum_{b=1}^{N_b} \sum_{(k,l)\in\{x,y\}} \zeta_{b,kl}^p[n,m] e^{-j\phi_{b,kl,n}} \tag{19}$$

The unwrapped phase over index m of $\zeta[n, m]$ is the cumulative time-varying longitudinal strain between fiber positions $(v_g/2)nT_s$ and $(v_g/2)(n+\Delta n)T_s$, at the time that the m-th frame was transmitted. Further processing of $\zeta[n, m]$ may include taking the fast Fourier transform over the time index m to reveal the frequency content of the vibration at every fiber position. A neural network operating on $\zeta[n, m]$ may also be used to classify the vibration event at every fiber position.

Our experiments have shown that a five-band MP-DF-OFDR experiment, produces improvement over TGD-OFDR.

To illustrate the superior performance of the multiband DF-OFDR (MB-DF-OFDR) method, we performed repeat experiments using a $N_b = 5$ band implementation of MB-DF-OFDR. The truncated chirped pulse $x_{tr}(t)$ has duration $T_c/N_b = 10$ µs and sweeps over a bandwidth of $1/N_b T = 10$ MHz.

The total bandwidth of x(t) is thus 50 MHz, compared to 10 MHz for conventional TGD-OFDR. It is observed that spatial leakage has been drastically reduced, as evidenced by the lack of a tail after the PZT at 50 km. Defining signal-to-interference ratio (SINR) to be the power difference between the peak at 50 km versus the average power after 50 km MB-DF-OFDR achieved an SINR of 34 dB, compared with 18 dB for conventional TGD-OFDR.

At this point, while we have presented this disclosure using some specific examples, those skilled in the art will recognize that our teachings are not so limited. Accordingly, this disclosure should only be limited by the scope of the claims attached hereto.

The invention claimed is:

1. A long-distance distributed fiber optic sensing (DFOS) and wavelength division multiplexed (WDM) telecommunications system comprising:
   an optical fiber sensor including a plurality of optical fiber cable spans, each individual one of the plurality of optical fiber cable spans including at least one Raman pump;
   a DFOS interrogator system in optical communication with the optical fiber sensor, the DFOS interrogator system including a code sequence generator that generates a coded interrogation sequence, the DFOS interrogator system configured to generate the coded interrogation sequence and introduce the generated coded interrogation sequence into the optical fiber sensor and receive scattered sensing data in response to the introduced generated coded interrogation sequence;
   an analyzer configured to analyze the scattered sensing data received by the DFOS interrogator system;
   a WDM transmitter configured to generate and introduce non-sensory WDM telecommunications signals into the optical fiber sensor;
   a wavelength selective switch (WSS) in optical communications with the DFOS interrogator system, the WDM transmitter, and the optical fiber sensor, the WSS interposed between the DFOS interrogator system and the optical fiber sensor and the WSS interposed between the WDM transmitter and the optical fiber sensor; and
   an optical circulator interposed between the WSS and the optical fiber sensor;
   wherein the DFOS coded interrogation sequence and the non-sensory telecommunications signals are simultaneously introduced into the optical fiber sensor;
   wherein one or more of the plurality of optical fiber cable spans exhibit both forward and backward Raman amplification; and
   wherein the one or more of the plurality of optical fiber cable spans that exhibit both forward and backward Raman amplification include at least two Raman pumps, one for the forward Raman amplification and another one for the backward Raman amplification.

2. The system of claim 1, wherein the forward and backward Raman amplification is provided without optical isolation.

* * * * *